United States Patent
Suguro et al.

(10) Patent No.: US 9,873,391 B2
(45) Date of Patent: Jan. 23, 2018

(54) WIRE HARNESS

(71) Applicant: Yazaki Corporation, Minato-ku, Tokyo (JP)

(72) Inventors: Masaaki Suguro, Makinohara (JP); Hideomi Adachi, Makinohara (JP); Tatsuya Oga, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/984,453

(22) Filed: Dec. 30, 2015

(65) Prior Publication Data

US 2016/0114742 A1    Apr. 28, 2016

Related U.S. Application Data

(63) Continuation of application No. PCT/JP2014/067679, filed on Jul. 2, 2014.

(30) Foreign Application Priority Data

Jul. 2, 2013    (JP) .................... 2013-138795

(51) Int. Cl.
*B60R 16/02* (2006.01)
*H02G 3/04* (2006.01)
(Continued)

(52) U.S. Cl.
CPC ...... *B60R 16/0215* (2013.01); *B60R 16/0207* (2013.01); *H02G 3/0462* (2013.01); *H01B 7/24* (2013.01); *H01B 13/146* (2013.01)

(58) Field of Classification Search
None
See application file for complete search history.

(56) References Cited

U.S. PATENT DOCUMENTS 3,672,196 A * 6/1972 Levacher ............... B21D 15/06
29/728
5,283,392 A * 2/1994 Ooshima .............. H01B 7/0275
174/68.1
(Continued)

FOREIGN PATENT DOCUMENTS

JP    H01-036917 U    3/1989
JP    S64-036917 U    3/1989
(Continued)

OTHER PUBLICATIONS

Aug. 12, 2014—International Search Report—Intl App PCT/JP2014/067679.
(Continued)

*Primary Examiner* — William H Mayo, III
*Assistant Examiner* — Krystal Robinson
(74) *Attorney, Agent, or Firm* — Banner & Witcoff, Ltd.

(57) ABSTRACT

A wire harness includes a conductive path. The conductive path includes a conductor and a sheath that covers the conductor. The sheath includes a first sheath part arranged correspondingly to a route restriction section where route restriction is required and a second sheath part arranged correspondingly to a different section other than the route restriction section. The first sheath part is formed thicker than the second sheath part, and the first sheath part has rigidity.

5 Claims, 4 Drawing Sheets

(51) Int. Cl.
*H01B 13/14* (2006.01)
*H01B 7/24* (2006.01)

(56) References Cited

U.S. PATENT DOCUMENTS

| | | | | |
|---|---|---|---|---|
| 8,240,882 | B2* | 8/2012 | Liao | H05K 1/021 |
| | | | | 362/249.02 |
| 8,563,866 | B2 | 10/2013 | Oga et al. | |
| 8,633,387 | B2* | 1/2014 | Nachbauer | B60R 16/0207 |
| | | | | 174/72 A |
| 9,035,327 | B2* | 5/2015 | Bierhuizen | H01L 25/0753 |
| | | | | 257/84 |
| 2001/0011603 | A1* | 8/2001 | Ueno | H01B 7/0045 |
| | | | | 174/117 FF |
| 2002/0179318 | A1* | 12/2002 | Seo | H02G 3/0468 |
| | | | | 174/71 R |
| 2004/0154817 | A1* | 8/2004 | Sudo | H02G 3/06 |
| | | | | 174/481 |
| 2005/0011687 | A1* | 1/2005 | Yamaguchi | B60K 6/48 |
| | | | | 180/65.1 |
| 2006/0032657 | A1* | 2/2006 | Zarembo | A61N 1/056 |
| | | | | 174/69 |
| 2006/0278423 | A1* | 12/2006 | Ichikawa | B60R 16/0215 |
| | | | | 174/72 A |
| 2009/0014203 | A1 | 1/2009 | Bikhleyzer | |
| 2009/0116252 | A1* | 5/2009 | Kille | H05K 1/0204 |
| | | | | 362/373 |
| 2010/0193236 | A1* | 8/2010 | Aumoitte | H01B 9/028 |
| | | | | 174/388 |
| 2011/0064565 | A1* | 3/2011 | Jones | H01B 7/065 |
| | | | | 415/121.3 |
| 2011/0067920 | A1* | 3/2011 | Toyama | B60R 16/0207 |
| | | | | 174/72 A |
| 2011/0132638 | A1 | 6/2011 | Oga et al. | |
| 2011/0279981 | A1* | 11/2011 | Horng | H01L 23/3677 |
| | | | | 361/720 |
| 2011/0297415 | A1* | 12/2011 | Katou | B60R 16/0215 |
| | | | | 174/68.3 |
| 2013/0140054 | A1* | 6/2013 | Kato | B60R 16/0215 |
| | | | | 174/68.3 |
| 2013/0180776 | A1* | 7/2013 | Gotou | B60R 16/0215 |
| | | | | 174/70 C |
| 2013/0306370 | A1* | 11/2013 | Sato | H01B 13/24 |
| | | | | 174/72 A |
| 2014/0102783 | A1 | 4/2014 | Nagahashi | |
| 2014/0202762 | A1* | 7/2014 | Adachi | H01R 13/6599 |
| | | | | 174/72 A |
| 2014/0290572 | A1 | 10/2014 | Sato | |
| 2014/0295067 | A1 | 10/2014 | Sato | |
| 2014/0326479 | A1* | 11/2014 | Itani | B60R 16/0215 |
| | | | | 174/68.3 |
| 2015/0136483 | A1* | 5/2015 | Inao | H01B 7/2825 |
| | | | | 174/72 A |
| 2015/0179300 | A1* | 6/2015 | Inao | B60R 16/0215 |
| | | | | 174/68.3 |
| 2015/0333244 | A1* | 11/2015 | Iriyama | F01N 3/043 |
| | | | | 136/212 |

FOREIGN PATENT DOCUMENTS

| | | |
|---|---|---|
| JP | 2010-051042 A | 3/2010 |
| JP | 2012-243550 A | 12/2012 |
| WO | 2012-108025 A1 | 8/2012 |

OTHER PUBLICATIONS

Jan. 14, 2016—(WO) Int'l Prelim Report on Patentabiliy & Written Opinion of the ISA—Intl App PCT/JP2014/067679.
Feb. 23, 2017—(JP) Notification of Reasons for Refusal—App 2013-138795.
Apr. 28, 2017—(JP) Decision of Refusal—App 2013-138795, Eng Tran.

* cited by examiner

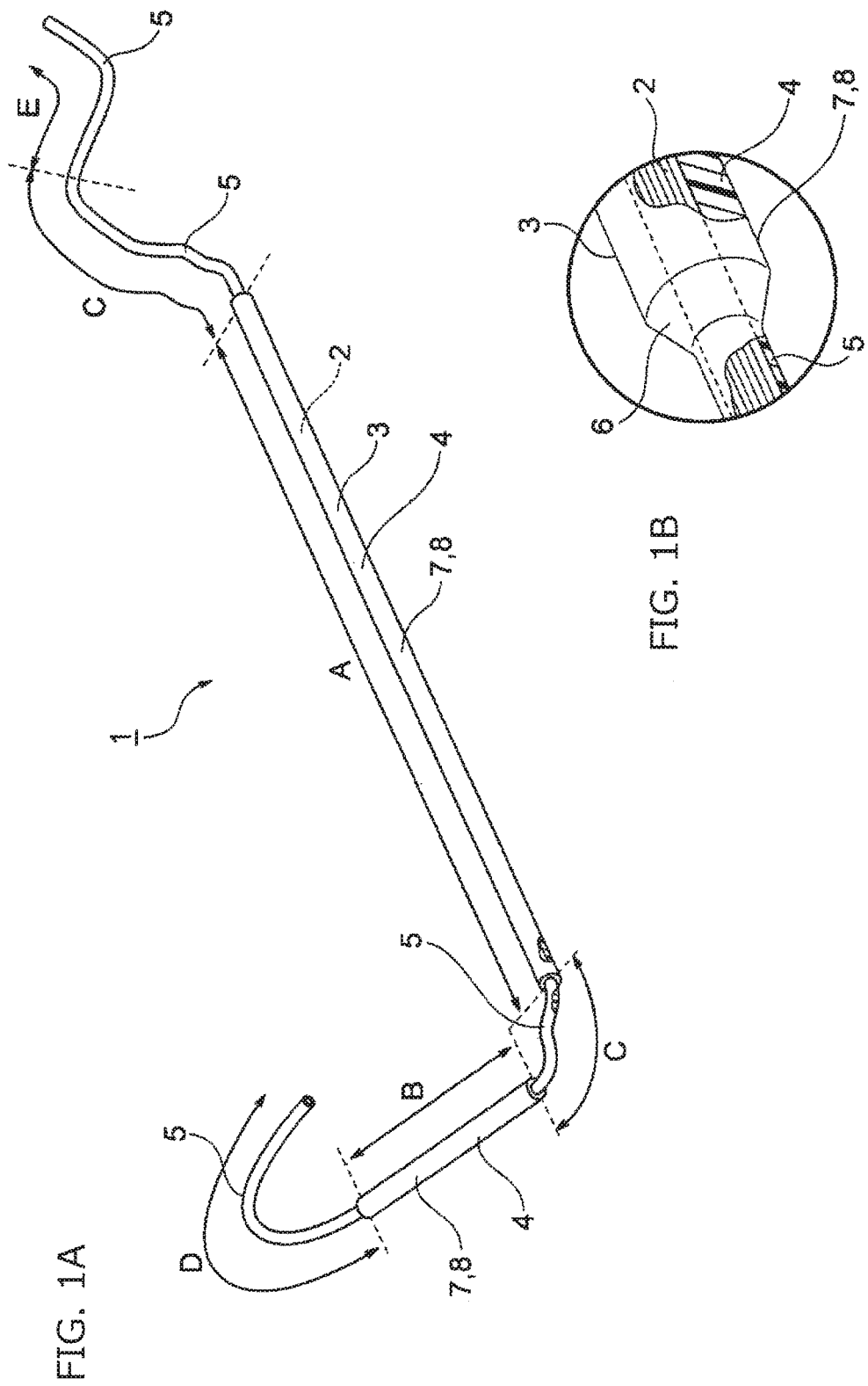

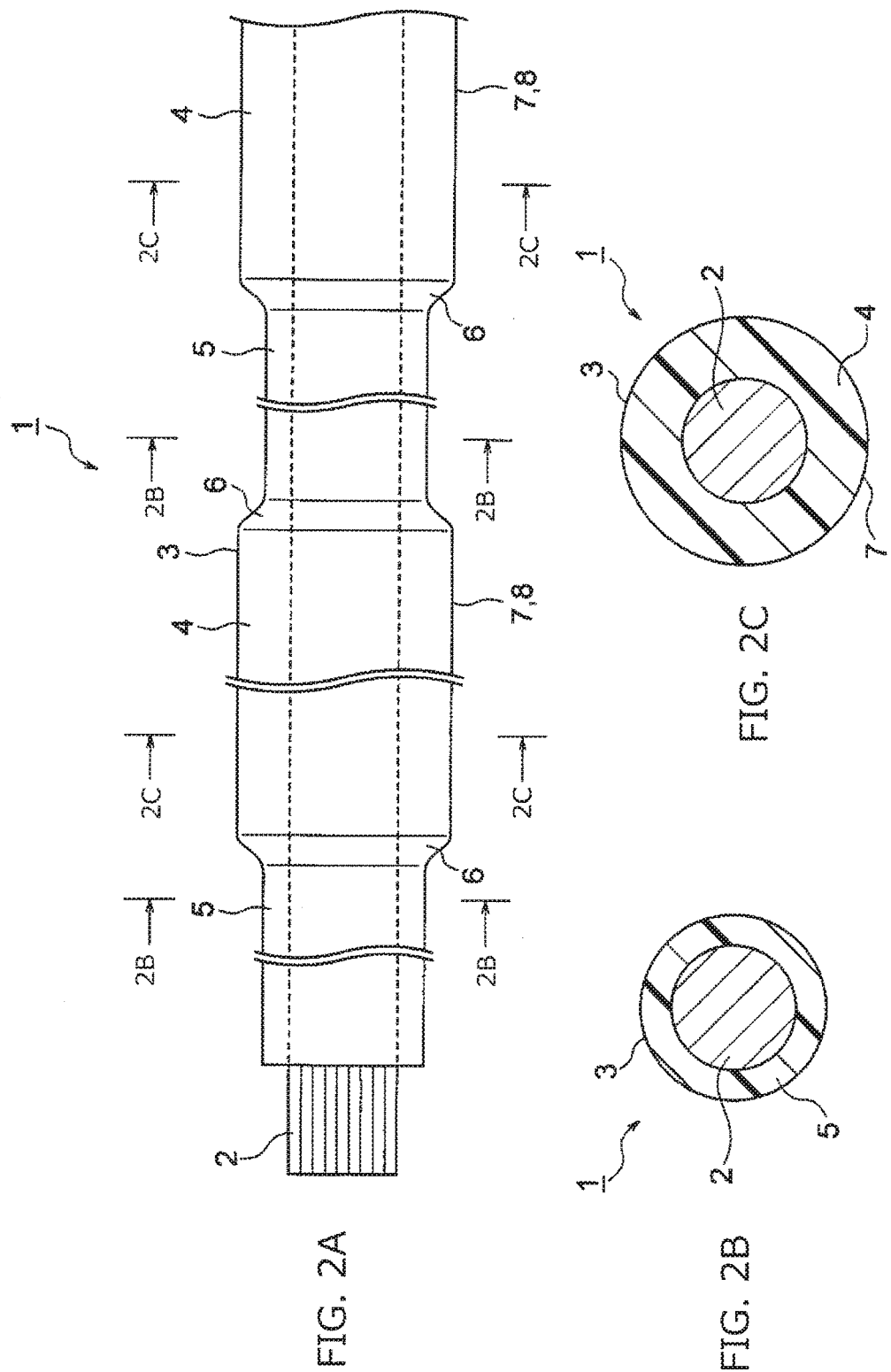

WIRE HARNESS

CROSS REFERENCE TO RELATED APPLICATIONS

This application is a continuation of PCT application No. PCT/JP2014/067679, which was filed on Jul. 2, 2014 based on Japanese Patent Application (No. P2013-138795) filed on Jul. 2, 2013, the contents of which are incorporated herein by reference.

BACKGROUND OF THE INVENTION

1. Field of the Invention

The invention relates to a wire harness including one or multiple conductive paths.

2. Description of the Related Art

Conventionally, there is known a wire harness for electrically connecting together high-voltage equipment to be mounted, for example, on hybrid or electric vehicles.

A wire harness disclosed in the below-cited Patent Literature 1 includes multiple conductive paths, a resin-made corrugated tube for storing the multiple conductive paths collectively, and a resin-made protector. The corrugated tube is formed in a flexible bellows shape and multiple tubes are arranged side by side in the longitudinal direction of the wire harness. The protector is arranged in a position where route restriction is required. The protector is also arranged at a position to connect together the mutually adjoining corrugated tubes. The corrugated tube and protector are used as exterior members.

Patent Literature 1 is JP-A-2010-51042.

SUMMARY OF THE INVENTION

In the above conventional wire harness, for route restriction, post-attached exterior members are necessary. This increases the number of components and thus the cost of the wire harness, and increases workload for manufacturing the wire harness.

To solve these problems, there is required a structure which excludes the post-attached exterior member. However, simple exclusion of the exterior member disables route restriction in the wire harness.

The invention is made in view of the above circumstances and thus has an object to provide a wire harness which can realize route restriction even when the post-attached exterior member is excluded and also reduce cost and workload by excluding the post-attached exterior member.

The above object of the invention is attained by the following structures.

(1) A wire harness including a conductive path, wherein the conductive path includes a conductor and a sheath that covers the conductor, the sheath includes a first sheath part arranged correspondingly to a route restriction section where route restriction is required and a second sheath part arranged correspondingly to a different section other than the route restriction section, the first sheath part is formed thicker than the second sheath part, and the first sheath part has rigidity.

According to the structure (1), the conductive path has a structure that the conductor is covered with the sheath including multiple kinds of sheath parts. Therefore, it is obviously different from a structure that multiple kinds of known electric wires are connected together into one. Also, in the invention, the multiple kinds of sheath parts include at least two kinds of sheath parts, namely, the first sheath part arranged correspondingly to the route restriction section where route restriction is required and the second sheath part arranged correspondingly to the different section other than the route restriction section, the first sheath part is thicker than the second sheath part, and the first sheath part also provides a rigid part in the conductive path. Therefore, the conductive path is obviously different from a known wire sheath. The above structure enables route restriction even when the post-attached exterior member is excluded. Here, the first and second sheath parts are formed to have a substantially uniform thickness in the peripheral direction. And, according to the specifications of the different section, a third sheath part, a fourth sheath part and the like may also be added.

(2) A wire harness according to the structure (1), wherein the first and second sheath parts are formed continuously, and the thickness of the connecting portion between the first and second sheath parts changes in a tapered-shape.

In the (2) structure, continuous formation of the first and second sheath parts can reduce workload for manufacturing the two kinds of sheath parts separately and connecting them together.

(3) A wire harness according to the structure (1) or (2), wherein the first sheath part is also formed as the straight part of the conductive path.

In the (3) structure, since the thick and rigid first sheath part also provides the straight part of the conductive path, it provides an effective part when performing such route restriction as maintains the straight state.

According to the structure (1) of the invention, as can be understood from the structure of the conductive path, route restriction is possible even when the post-attached exterior member is excluded. Also, exclusion of the post-attached exterior member can realize reduction in cost and workload.

According to the structure (2) of the invention, in addition to the above effects, workload for connecting the first and second sheath parts can be reduced, thereby enabling reduction in cost and manufacturing time.

According to the structure (3) of the invention, in addition to the above effects, the straight state can be maintained. Also, use of a structure capable of maintaining the straight state can enhance the operation efficiency of the wire harness arrangement.

BRIEF DESCRIPTION OF THE DRAWINGS

FIGS. 1A and 1B illustrate a conductive path configuring a wire harness according to an embodiment of the invention, FIG. 1A is a perspective view and FIG. 1B is a partially enlarged view.

FIGS. 2A to 2C illustrate a conductive path, FIG. 2A is a side view, FIG. 2B is a section view taken along the 2B-2B line of FIG. 2A, and FIG. 2C is a section view taken along the 2C-2C line of FIG. 2A.

FIGS. 3A and 3B are section views illustrating a single core structure, and FIGS. 3C and 3D are section views illustrating a two-core structure.

DETAILED DESCRIPTION OF THE EXEMPLARY EMBODIMENTS

Figure 3C:
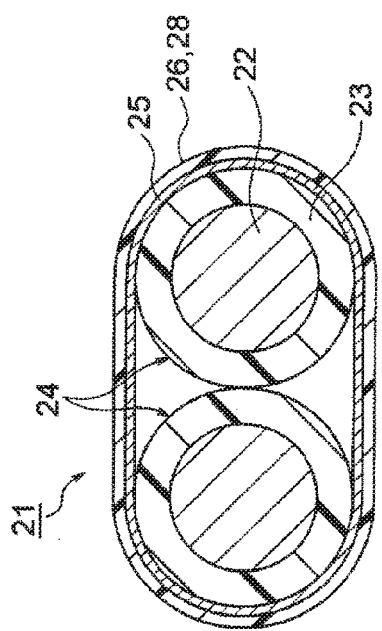
FIGS. 3A to 3D illustrate other examples of the conductive path.

Description is given below of a wire harness according to the embodiment.

FIG. 1A is a perspective view of an electric wire according to the embodiment. FIG. 1B is a partially enlarged view of the vicinity of a connecting portion between a first insulator 4 and a second insulator 5, both of which are described later. FIGS. 2A to 2C illustrate a side view and section views of the electric wire, FIGS. 3A to 3D illustrate section views of other examples, and FIG. 4 is a schematic diagram of an arranged state of the wire harness according to the embodiment.

The wire harness includes one or multiple conductive paths. The conductive path includes a conductor and a sheath that includes multiple kinds of sheath parts different in thickness and rigidity according to sections.

FIGS. 1A to 2C illustrate a conductive path 1 configuring the wire harness of the embodiment. The conductive path 1 is here one for high voltage (high-voltage conductive path) which includes a conductor 2 and an insulator 3 (sheath). The conductive path 1, as will be understood from the following description, has a structure corresponding to sections.

The conductive path 1 includes parts corresponding to route restriction sections A, B where route restriction is required, and parts corresponding to different sections other than the route restriction sections A, B, that is, different sections C, D, E. Here, the number of sections illustrated is an example. The route restriction section A is set long, while the route restriction section B is set shorter than the section A. The different section C is set to have a specific length from the end of the route restriction section A. Also, the different sections D, E are set to have a specific length in both ends of the conductive path 1. The route restriction section A, B part has rigidity capable of retaining shape, whereas the different section C, D, E part is flexible with its rigidity lower than that of the route restriction sections A, B.

The conductor 2 is made of metal and has conductivity. The conductor 2 is formed to extend with the substantially same diameter from one end to the other end of the conductive path 1. The conductor 2 is made of copper or copper alloy, or aluminum or aluminum alloy. The conductor 2 may have a conductor structure including intertwined strands, or a rod-shaped conductor structure having a rectangular or round section (for example, a conductor structure having a straight single core or a round single core; in this case, the electric wire itself is formed in a rod shape). In this embodiment, the conductor 2 includes aluminum-made intertwined strands.

Here, the conductor 2 may also have a conductor structure formed in a plate shape like a known bus bar. Also, when the conductor 2 includes intertwined strands, the strand may be intertwined together with a core member (a wire member serving as a rigid body) as the center. On an outer surface of the conductor 2, the insulator 3 made of insulating resin material is formed by extrusion molding. The resin material is selected properly from PP, PVC, cross-linked PE and the like in consideration of wear resistance, chemical resistance, heat resistance and the like. The insulator 3 is formed to extend from one end to the other end of the conductive path 1.

The insulator 3 includes a first insulator 4 (first sheath part) and a second insulator 5 (second sheath part). The first insulator 4 is formed as a sheath part corresponding to the route restriction sections A, B of FIG. 1A. Meanwhile, the second insulator 5 is formed as a sheath part corresponding to the different sections C, D, E. The first and second insulators 4 and 5 are formed continuously.

Describing first the second insulator 5 corresponding to the different sections C, D, E, the second insulator 5 is formed to have a thickness capable of securing the minimum level of insulation to the conductor 2. That is, the second insulator 5 is formed to have the same thickness as the insulator of a conventional high-voltage wire. Since the section shape of the conductor 2 is circular as illustrated, it is formed in a circular shape capable of covering the conductor 2 outer periphery (the section shape is an example). The second insulator 5 is formed such that the thickness from the inner surface to the outer surface thereof is substantially uniform, that is, the thickness in the peripheral direction is substantially uniform.

The second insulator 5 is formed such that the conductive path 1 is flexible in the parts corresponding to the different sections C, D, E. In other words, the second insulator 5 is formed such that the conductive path 1 is bendable. Here, such bendability enables the part of the conductive path 1 corresponding to the different sections C, D, E to secure good connection to an electric connection partner.

The first insulator 4 is formed thicker than the second insulator 5. That is, a sheath section area of the first insulator 4 is formed larger than that of the second insulator 5 (than the insulator of a conventional high-voltage wire). The first insulator 4 is formed such that a thickness from its inner surface to its outer surface is substantially uniform, that is, its peripheral-direction thickness is substantially uniform.

The first insulator 4 has sufficiently higher rigidity than the second insulator 5. Such rigidity enables the first insulator 4 arranged part to maintain the shape of the conductive path 1. Also, even when wear or external force is applied thereto, the first insulator 4 can secure sufficient insulation to the conductor 2. Further, a large thickness of the first insulator 4 provides sufficient strength. When the insulator 3 has the above-mentioned first insulator 4, a conventional exterior member can be excluded.

The first insulator 4 is formed as a rigid part 7 in the conductive path 1. Also, as can be seen from the drawings, it is formed straight and thus it is also formed as a straight part 8 in the conductive path 1.

The first and second insulators 4 and 5 are formed by extrusion molding as described above. Specifically, while changing the speed of an extrusion molding machine, the insulators are formed into the illustrated shapes. Thus, since the first and second insulators 4 and 5 are formed while changing the speed of the extrusion molding machine, the connecting portion therebetween is formed in a step shape such as a taper 6. Here, the shapes of the first and second insulators 4 and 5 are different in thickness in a single layer but are not in two layers of upper and lower layers.

Here, with reference to FIGS. 3A to 3D, description is given of modifications of the conductive path. Describing the FIGS. 3A and 3B first, a shielded electric wire 11 includes a conductor 12, an insulator 13 that covers the conductor 12, a shield member 14 provided on the outside of the insulator 13, and a sheath 15 (sheath) provided on the outside of the shield member 14. The shielded electric wire 11 is a high-voltage wire having a shield function.

The shield member 14 is formed by a known braid or metal foil, and has conductivity. The sheath 15 includes a first sheath 16 (first sheath part) and a second sheath 17 (second sheath part) in multiple numbers in the electric wire axial direction. The first and second sheaths 16 and 17 have the same functions as the first and second insulators 4 and 5 of the conductive path 1 in FIGS. 1A to 2C.

Figure 3D:
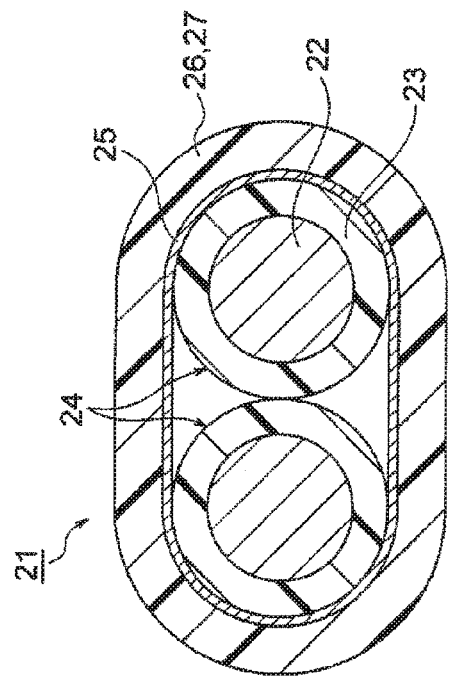
Figure 3A:
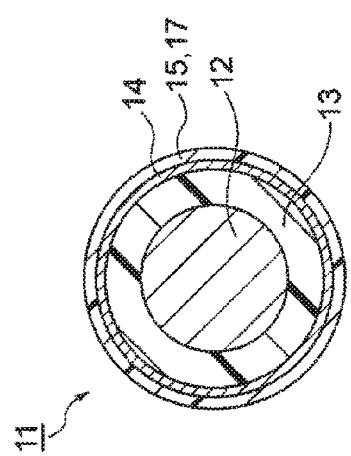
Figure 3B:
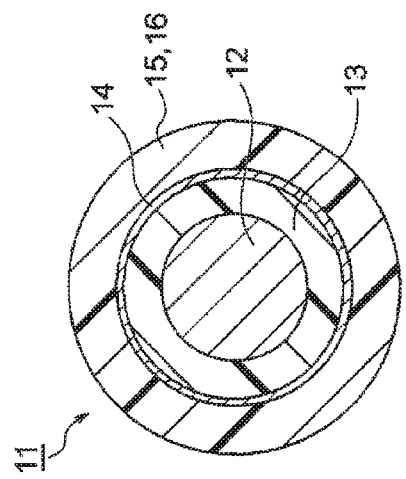
Figure 4:
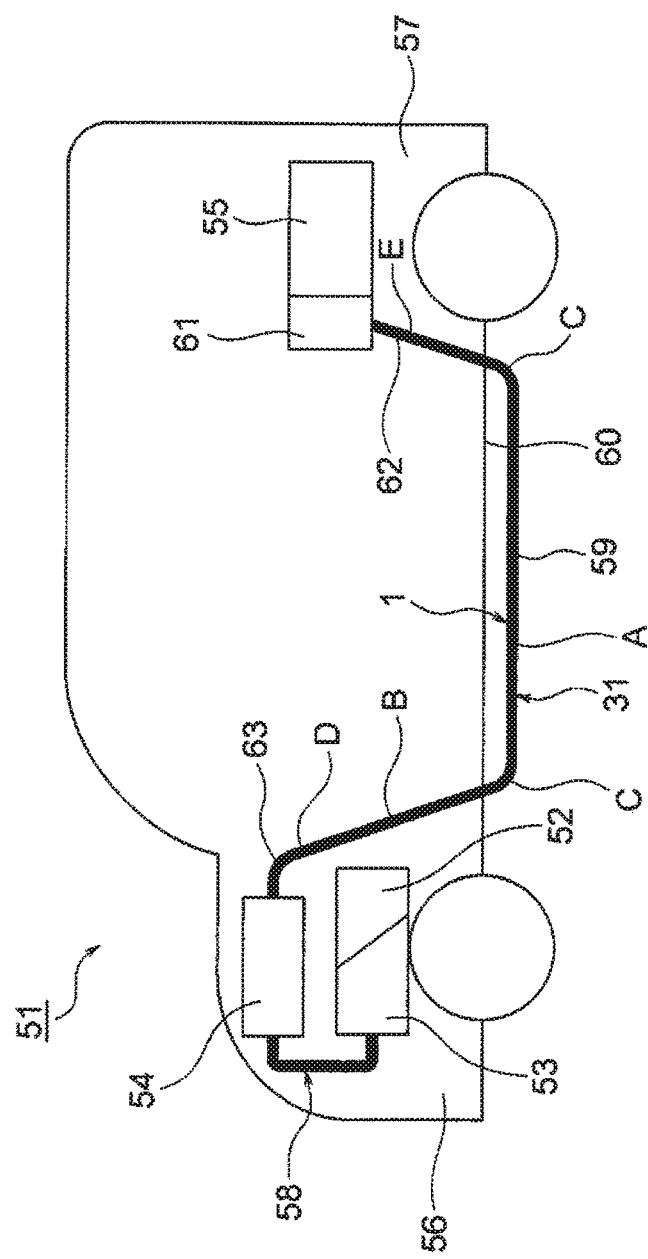
FIG. 4 is a schematic diagram of an arranged state of the wire harness according to the embodiment of the invention.

As illustrated in FIGS. 3C and 3D, a cabtire cable (conductive path) 21 includes two electric wires 24 each having a conductor 22 and an insulator 23, a shield member 25 provided on the outside of the two electric wires 24 in a juxtaposed state, and a sheath 26 (sheath) provided on the outside of the shield member 25. The cabtire cable 21 is a high-voltage wire having a shield function.

The shield member 25, similarly to the shield member 14, is formed by a known braid or metal foil, and has conductivity. Here, the cabtire cable 21 may also include three or more electric wires 24. The sheath 26 includes a first sheath 27 (first sheath part) and a second sheath 28 (second sheath part) in multiple numbers in the electric wire axial direction. The first and second sheaths 27 and 28 have the same functions as the first and second insulators 4 and 5 of the conductive path 1 of FIGS. 1A to 2C.

In the above modification, using the conductive path 1 and shielded electric wire 11, or cabtire cable 21, a wire harness 31 is manufactured. The wire harness 31, as illustrated in FIG. 4, is arranged, for example, at a specific position of a hybrid vehicle (which may also be an electric vehicle or an ordinary vehicle).

As illustrated in FIG. 4, a hybrid vehicle 51 is driven by combining two kinds of power from an engine 52 and a motor unit 53, while power is supplied to the motor unit 53 from a battery 55 (cell pack) through an inverter unit 54. The engine 52, motor unit 53 and inverter unit 54, in this embodiment, are mounted in an engine room 56 situated adjacent to front wheels. Also, the battery 55 is mounted in a vehicle rear part 57 situated adjacent to rear wheels. Here, the battery 55 may also be mounted within a vehicle room existing backward of the engine room 56.

The motor unit 53 and inverter unit 54 are connected together by a high-voltage motor cable 58. The battery 55 and inverter unit 54 are connected together by a high-voltage wire harness 31. An intermediate part 59 of the wire harness 31 is arranged on a vehicle underfloor 60 substantially in parallel along the vehicle underfloor 60. The intermediate part 59 is arranged with its shape retained. The vehicle underfloor 60 is a known body and is a so called panel member at a specific position of which there is formed a penetration hole (not illustrated). The wire harness 31 is inserted through this penetration hole.

The wire harness 31 and battery 55 are connected together through a junction block 61 provided in the battery 55. To the junction block 61, the rear end 62 of the wire harness 31 is electrically connected by a known method. The front end 63 of the wire harness 31 is electrically connected to the inverter unit 54 by a known method. The front and rear ends 63 and 62 of the wire harness 31 are flexible and are easy for electric connection.

As has been described heretofore with reference to FIGS. 1A to 4, according to the wire harness 31 of the invention, as can also be understood from the structure of the conductive path 1, even when the post-attached exterior member is excluded, route restriction is possible. Also, exclusion of the post-attached exterior member enables reduction in cost and workload.

Now, the characteristics of the above embodiment of the invention are described briefly in the following articles [1] to [3].

[1] The wire harness (31) including the conductive path (1), wherein the conductive path (1) includes the conductor (2) and the sheath (insulator 3) that covers the conductor (2), the sheath (insulator 3) includes the first sheath part (first insulator 4) arranged correspondingly to the route restriction section where route restriction is required and the second sheath part (second insulator 5) arranged correspondingly to the different section from the route restriction section, and the first sheath part (first insulator 4) is thicker than the second sheath part (second insulator 5), and the first sheath part (first insulator 4) has rigidity.

[2] The wire harness (31) according to the article [1], wherein the first sheath part (first insulator 4) and second sheath part (second insulator 5) are formed continuously, and the thickness of the connecting portion between the first sheath part (first insulator 4) and second sheath part (second insulator 5) changes in a tapered-shape.

[3] The wire harness (31) according to the article [1] or [2], wherein the first sheath part (first insulator 4) is formed as the straight part of the conductive path (1).

Although the invention has been described heretofore specifically with reference to the specific embodiments thereof, it is obvious to those skilled in the art that various changes and modifications are possible without departing from the spirit and scope of the invention.

This application is based on the Japanese Patent Application (JPA No. 2013-138795) filed on Jul. 2, 2013 and thus the contents thereof are incorporated herein for reference.

The invention can provide an effect that, even when a post-attached exterior member is excluded, route restriction is possible and, by excluding the post-attached exterior member, cost and workload can be reduced. The invention having this effect can be effectively applied to a wire harness including one or multiple conductive paths.

What is claimed is:

1. A wire harness arranged on a vehicle underfloor and comprising:
    a high-voltage conductive path, the high-voltage conductive path including
        a conductor; and
        a sheath that covers the conductor, the sheath including
            a plurality of first sheath parts arranged correspondingly to route restriction sections where route restriction is required and a second sheath part arranged correspondingly to a different section other than the route restriction sections, each of the plurality of first sheath parts being thicker than the second sheath part from an inner surface to an outer surface thereof, and the first sheath parts having rigidity greater than rigidity of the second sheath part,
        wherein at least one of the first sheath parts is longer than the second sheath part; and
        wherein a thickness of each first sheath part is uniform from its inner surface to its outer surface and each first sheath part is a straight part in the high-voltage conductive path and the second sheath part is bendable in the high-voltage conductive path.

2. The wire harness according to claim 1, wherein
the first and second sheath parts are formed continuously, and
a thickness of a connecting portion between the first and second sheath parts changes in a tapered-shape.

3. The wire harness according to claim 1, wherein the first sheath parts and the second sheath part are made of an insulating material.

4. The wire harness according to claim 3, where the insulating material is a resin.

5. The wire harness according to claim 1, wherein a sheath section area of each of the first sheath parts is larger than that of the second sheath part.

* * * * *